2,901,313

SEPARATION OF PLUTONIUM FROM WATER INSOLUBLE FLUORIDES DERIVED FROM NITRATE SOLUTIONS OF PLUTONIUM, URANIUM AND FISSION PRODUCTS

Alfred Gavin Maddock, Didcot, and Fred Smith, Birmingham, England, assignors, by mesne assignments, to the United States of America as represented by the United States Atomic Energy Commission No Drawing. Application March 5, 1948
Serial No. 19,638

6 Claims. (Cl. 23—14.5)

This invention relates to the separation of plutonium from solutions containing the same and other metals.

The object of the invention is to provide a method for the efficient recovery of plutonium from mixture in which it is present with uranium and other metals, which method will be suitable for remote control.

In accordance with the invention plutonium in a valency state not higher than quadrivalent, when adsorbed or chemisorbed on a water insoluble fluoride, for example, a fluoride of calcium or lanthanum or other rare earth metal is extracted with a moderately concentrated or concentrated aqueous solution of a nitrate having solvent properties for the adsorbed or chemisorbed plutonium. Aqueous solutions of aluminium nitrate and ferric nitrate separately or in admixture are preferred for use in accordance with the invention. Manganous nitrate is not so satisfactory as the nitrates mentioned.

Further, in accordance with the invention, the extract obtained in the manner described may be extracted with an organic liquid having solvent properties for the plutonium and the latter recovered from the organic solution.

Where the adsorbate employed in accordance with the invention is a freshly precipitated fluoride it will usually be found to pass into solution in the aqueous nitrate solutions with the plutonium. Sintered, heat treated or aged samples of the fluorides referred to are ordinarily only slightly soluble or dissolve very slowly in the aqueous nitrate solution.

A concentration of the nitrate solution which has been found suitable is approximately 50 percent of saturation, but concentrations of from 40 to 100 percent of saturation may be employed. The higher concentrations however have been found to be less selective and to tend to dissolve appreciably even sintered, heat treated or aged adsorbates.

Nitromethane, diethyl ether and methyl-iso-butyl acetone have been found suitable as organic liquids for the purpose of the invention.

In carrying the invention into effect according to one convenient method, a solution containing plutonium in the quadrivalent or tervalent state and uranium may be applied to an adsorption system comprising sintered calcium or lanthanum fluoride to bring about chemisorption of the plutonium, leaving the uranium in solution. The adsorption system may be washed to remove uranium solution and then treated with an aqueous solution of ferric or aluminium nitrate of a concentration of about 50 percent of saturation to recover the plutonium. Relatively little of the adsorbate substance will pass into the nitrate solution.

In a copending application, S.N. 698,870, filed September 23, 1946, entitled Separation of Plutonium, there is disclosed a method in which pile irradiated uranium rods are dissolved in nitric acid and the solution thus obtained is treated, with for example, potassium dichromate, to oxidize the plutonium to the hexavalent state. The solution is then applied to a fluoride, such as sintered calcium or lanthanum fluoride, to largely remove the fission products. The plutonium in the residual solution is reduced to the quadri- or tervalent state and the solution is applied to another batch of relatively insoluble fluoride to adsorb the plutonium, leaving the uranium in solution. The chemisorbed plutonium is then removed from the fluoride with ammonium oxalate or the like.

The method of the present invention outlined above may be employed for recovery of the plutonium chemisorbed according to the method of the prior specification. Thus the plutonium chemisorbed on the calcium or other fluoride is removed by treatment with an aqueous solution of aluminium nitrate or ferric nitrate to dissolve selectively the plutonium fluoride. The solution thus obtained contains over 99% of the plutonium chemisorbed on the carrying agent. Sintered, precipitated calcium fluoride or lanthanum fluoride are preferred for the chemisorption of the plutonium since as indicated above they are less soluble in the nitrate solutions than the freshly prepared fluorides. The plutonium is then removed from the solution by extraction with the organic liquid. It is preferable to saturate the plutonium solution with a nitrate, for example calcium nitrate, zinc nitrate, ammonium nitrate, ferric nitrate, aluminium nitrate, copper nitrate before extraction. When using the 50% ferric nitrate solution as above described, ferric nitrate crystals were added to saturation of the solution.

The following example is illustrative of the application of the method to a solution containing active fission products.

Example 1

100 ml. of oxidized nitrate solution of uranium fission products was used, containing plutonium to give 200,000 counts per minute and fission products to give 1,600,000 counts per minute when the counts were made after passing through an aluminium screen of about 72 mg. per sq. cm. The solution was applied to a column 1 cm. in diameter and 20 cm. high containing sintered calcium fluoride to remove the fission products. The effluent was reduced with $SO_2$ and passed through another similar column containing sintered calcium fluoride to absorb the plutonium. 30 ml. of 50% saturated ferric nitrate was applied to the column to recover the plutonium and the solution was saturated with ferric nitrate. It was then extracted with three successive portions of 30 ml. of nitromethane. The combined extracts contained 98% of the plutonium and 0.1% of the activity originally present.

In accordance with another method of carrying the invention into effect, precipitation of plutonium in the quadrivalent or tervalent state as fluoride simultaneously with precipitation of a larger amount of another insoluble fluoride, preferably calcium or lanthanum is brought about, the latter fluoride acting as carrying agent or adsorbate. The separated precipitate may then be dissolved in a moderately concentrated solution of ferric or aluminium nitrate.

Thus, for example, in separating plutonium from uranium in a solution of their nitrates, the carrying agent or adsorbate for the plutonium may be provided by addition of calcium or lanthanum or other rare earth metal nitrate. Hydrofluoric acid may then be added to convert the plutonium and the added salt into fluorides. The fluoride precipitate may be removed from the liquor by centrifugal means. The precipitation step may be repeated on the mother liquor to increase the recovery of plutonium. The total precipitated fluorides may then be treated with a moderately concentrated solution of aluminium or ferric nitrate and the resulting solution extracted with an organic solvent to recover the plutonium.

The following is an example of this method of carrying the invention into effect, as applied to treatment of a solution of tervalent and/or quadrivalent plutonium as nitrate and uranyl nitrate, from which solution most of the uranium fission products have been removed.

Example 2

To a solution containing 1 mg. of plutonium and 10 grams of uranyl nitrate in each 100 ml. is added 10 mg. of lanthanum nitrate. The solution is then made about 3 N in hydrofluoric acid to form a precipitate containing the plutonium and lanthanum as fluorides. About 90% of the plutonium comes down in this precipitate. The lanthanum fluoride acts as a carrying agent for the plutonium. The precipitation is repeated by adding a further 10 mg. of lanthanum nitrate. This precipitates a further 8% of the plutonium. These precipitates are treated with a solution of ferric nitrate having a concentration of 40 to 100% of saturation. Upon extracting the plutonium fluoride solution with nitromethane the extraction coefficient is 3. By extraction with three successive fresh amounts of the solvent, equal in volume to the solution under treatment, over 90% of the plutonium in the dissolved precipitates is recovered. The plutonium is removed from the nitro-methane with water, preferably distilled water.

The treatment according to the invention is such as may readily be carried out with remote control, so that operators may be protected from any dangerous radiations of the substances being treated.

It will be appreciated that while aluminium, ferric and manganous nitrates have been mentioned as examples of substances whose aqueous solutions have solvent properties for plutonium compounds adsorbed or chemisorbed on water insoluble fluorides, other nitrates having such properties may be employed according to the invention.

Plutonium is useful as an enriching substance for the fuel of nuclear chain reaction piles and may be added as such to natural uranium or uranium which has been depleted in $U^{235}$. Piles employing such enriched fuel are a source of heat energy which may find application in the generation of other forms of industrial power, and in addition constitute an important source of thermal neutrons which may be employed for neutron irradiation of substances to produce radioactive isotopes. The latter are receiving considerable attention and are being employed in many fields of investigation, for example in research in chemistry, physiology, biology and metallurgy and also in therapy. The isotopes phosphorus 32, carbon 14, iodine 130, iodine 131, cobalt 60 and barium 140 may be mentioned in this connection. The fission products of such piles are also a potential source of useful materials, for example iodine 131 and ruthenium, and may also find use in radiography.

Plutonium per se may be used in a fast nuclear chain reactor, which besides furnishing heat energy, which may be usefully employed, consitutes an intense source of fast neutrons.

What is claimed is:

1. A method for separating plutonium from uranium and fission products which comprises treating a nitrate solution of fission products, uranium and hexavalent plutonium with a relatively water insoluble fluoride to adsorb fission products on the fluoride, treating the residual solution with a reducing agent for plutonium to reduce its valence to four and less, treating the reduced plutonium solution with a relatively insoluble fluoride to adsorb the plutonium on the fluoride, removing the solution and subsequently treating the fluoride with its adsorbed plutonium with a concentrated aqueous solution of at least one of a group consisting of aluminium nitrate, ferric nitrate and manganous nitrate to remove the plutonium from the fluoride.

2. A method of separating plutonium from a mixture of relatively water insoluble fluorides containing plutonium in not higher than the tetravalent state which comprises treating the mixture with 40 to 100% saturated aqueous nitrate solution of at least one of a group consisting of aluminium nitrate, ferric nitrate and manganous nitrate to selectively dissolve the plutonium and removing the solution formed.

3. A method as defined in claim 2 wherein the plutonium is extracted from the solution with an organic solvent.

4. A method as defined in claim 2 wherein the mixture is treated with an aqueous solution of aluminium nitrate of substantially 50% concentration.

5. A method as defined in claim 2 wherein the mixture is treated with an aqueous solution of ferric nitrate of substantially 50% concentration.

6. A method of recovering plutonium from nitrate solutions containing it in not higher than the tetravalent state which comprises adding to the solution a water soluble nitrate salt from the group consisting of calcium nitrate and lanthanum nitrate adding hydrofluoric acid to form a precipitate of water insoluble fluorides including plutonium, removing the precipitate, treating it with a 40 to 100% saturated aqueous solution of one of a group consisting of aluminium nitrate, ferric nitrate and manganous nitrate to selectively dissolve the plutonium and removing the plutonium from the solution by extraction with an organic solvent.

References Cited in the file of this patent

UNITED STATES PATENTS 2,227,833    Hixson et al. _____ Jan. 7, 1941

OTHER REFERENCES

Harvey et al.: "Journal of the Chemical Society," August 1947, pp. 1010–1021.

Seaborg et al.: "Journal of the American Chemical Society," vol. 70, pp. 1128–1134 (1948).